(12) United States Patent
Schulz et al.

(10) Patent No.: US 10,944,334 B2
(45) Date of Patent: Mar. 9, 2021

(54) SWITCHING POWER SUPPLY WITH RESONANT CONVERTER

(71) Applicant: Siemens Aktiengesellschaft, Munich (DE)

(72) Inventors: Stefan Schulz, Gnadendorf (AT); Janusz Dyszewski, Vienna (AT); Stefan Reschenauer, Atzelsdorf (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/349,671

(22) PCT Filed: Oct. 5, 2017

(86) PCT No.: PCT/EP2017/075334
§ 371 (c)(1),
(2) Date: May 14, 2019

(87) PCT Pub. No.: WO2018/086806
PCT Pub. Date: May 17, 2018

(65) Prior Publication Data
US 2019/0280612 A1    Sep. 12, 2019

(30) Foreign Application Priority Data

Nov. 14, 2016  (EP) ..................................... 16198690

(51) Int. Cl.
*H02M 7/06* (2006.01)
*H02M 5/458* (2006.01)
(Continued)

(52) U.S. Cl.
CPC ............. *H02M 7/06* (2013.01); *H02M 5/458* (2013.01); *H02H 3/253* (2013.01); *H02H 7/1255* (2013.01);
(Continued)

(58) Field of Classification Search
CPC ........... H02M 2001/007; H02M 5/458; H02M 1/4241; H02M 2001/0096; H02M 7/2176; H02H 3/253; H02H 7/1255
See application file for complete search history.

(56) References Cited

U.S. PATENT DOCUMENTS

| 5,563,758 A | 10/1996 | Dembrosky et al. |
| 2001/0011499 A1* | 8/2001 | Reyes ....................... B03C 3/68 95/7 |

(Continued)

FOREIGN PATENT DOCUMENTS

| CN | 1116741 | 2/1996 |
| CN | 103731047 | 4/2014 |

*Primary Examiner* — Harry R Behm
(74) *Attorney, Agent, or Firm* — Cozen O'Connor

(57) ABSTRACT

A switching power supply (switched-mode power device) includes a rectifier for a mains connection and for rectifying a three-phase AC voltage, a first converter and a second converter, the input voltage of which forms an intermediate circuit voltage, where the first converter regulates the intermediate circuit voltage such that the voltage substantially corresponds to a predefinable output voltage of the second converter multiplied by a load-independent transformation ratio on operation of the second converter with a resonant frequency, where upon forced reduction of the output voltage from the second converter, the first converter can set an, on average, sufficiently low intermediate circuit voltage such that the second converter can be operated substantially with the resonant frequency for a load-independent transformation ratio, where a signal for closed-loop control of the first converter stage can be derived from voltage and/or current information from the second converter.

21 Claims, 5 Drawing Sheets

(51) Int. Cl.
  *H02M 1/00* (2006.01)
  *H02M 1/42* (2007.01)
  *H02M 7/217* (2006.01)
  *H02H 7/125* (2006.01)
  *H02H 3/253* (2006.01)

(52) U.S. Cl.
  CPC ........ *H02M 1/4241* (2013.01); *H02M 7/2176* (2013.01); *H02M 2001/007* (2013.01); *H02M 2001/0058* (2013.01); *H02M 2001/0096* (2013.01)

(56) References Cited

U.S. PATENT DOCUMENTS

| | | | |
|---|---|---|---|
| 2005/0030772 A1* | 2/2005 | Phadke | H02M 1/4225 363/71 |
| 2006/0193153 A1 | 8/2006 | Erdl et al. | |
| 2007/0081364 A1* | 4/2007 | Andreycak | H02M 1/42 363/17 |
| 2009/0147553 A1 | 6/2009 | Ryu et al. | |
| 2009/0237057 A1* | 9/2009 | Dishman | H02M 3/156 323/285 |
| 2013/0194838 A1* | 8/2013 | Jang | H02M 1/4216 363/37 |
| 2013/0336017 A1* | 12/2013 | Uno | H02M 1/4225 363/21.02 |
| 2014/0104889 A1 | 4/2014 | Yamada et al. | |
| 2015/0280455 A1* | 10/2015 | Bosshard | H02J 5/005 307/104 |
| 2015/0357922 A1* | 12/2015 | Lai | H02M 3/33592 363/21.02 |
| 2016/0141964 A1* | 5/2016 | Yu | H02M 1/36 363/21.02 |
| 2018/0205313 A1* | 7/2018 | Greetham | H02J 7/022 |

* cited by examiner

SWITCHING POWER SUPPLY WITH RESONANT CONVERTER

CROSS-REFERENCE TO RELATED APPLICATIONS

This is a U.S. national stage of application No. PCT/EP2017/075334 filed Oct. 5, 2017. Priority is claimed on EP Application No. 16198690 filed Nov. 14, 2016, the content of which is incorporated herein by reference in its entirety.

BACKGROUND OF THE INVENTION

1. Field of the Invention

The present invention relates generally to the field of electrical engineering and, more particularly, to the field of power electronics and power electronic circuits for power supply and even more particularly, to a switching power supply or a switched-mode power device that includes a rectifier unit for a mains connection and for rectifying a three-phase mains or AC voltage, and a first converter stage, where the first converter stage is connected to the rectifier unit on the input side, where an output voltage of the rectifier unit forms an input voltage of the first converter stage and an output voltage of the first converter stage forms an intermediate circuit voltage, and where the switching power supply further comprises a second converter stage which is formed as a resonant converter, the input voltage of which forms the intermediate circuit voltage.

2. Description of the Related Art

Switched-mode power devices, which are also referred to as switching devices, have long been known and are used in many areas today to connect a load or a consumer to a power supply or a power source and to supply the respective load or the respective consumer with a mostly constant and frequently predeterminable voltage. To this end, a largely unstabilized input voltage (usually a DC or AC voltage originating from a power source) is converted into a constant output voltage by the switching power supply, where a constancy of the output voltage and/or the output current can be obtained by controlling the flow of energy into the switching power supply and the connected consumer. Depending on the application or depending on the requirements of the respective consumer, the output voltage may be greater or smaller than the input voltage.

Switching power supplies are known in a wide variety of forms. A rectification of the input voltage or the AC voltage in the switching power supply can be performed, for example, for a connection to an AC voltage or an AC voltage source. Voltage converters are usually used to convert the rectified input voltage into a constant output voltage.

Initially, "hard switching topologies", such as flyback converters or forward converters, were used as voltage converters in switching power supplies. The use of these hard-switching topologies has the disadvantage of some considerable losses in the switching operations. These losses lead to low efficiency, for example, and can produce a large amount of waste heat that must be released from the switching power supply to the environment. As a result, a specific volume of the switching power supply and cooling measures are required to avoid overheating. Furthermore, when using flyback or forward converters, for example, the switching losses prevent a switching frequency from being able to be increased as desired. This leads to limitations in the case of a reduction in size of the switching power supply as, for example, the design of the winding goods cannot be reduced as desired. Switching power supplies in which flyback or forward converters are used can therefore not be reduced in size as desired due to the switching losses and the large structural shape of the winding goods.

Therefore, for some time now, "soft switching" topologies, such as resonant converters for the conversion of input voltage into a constant output voltage in switching power supplies, have increasingly been used. Resonant converters represent a special circuit-oriented form of a DC converter, which operates in order to transmit energy via a resonant circuit. Soft switching topologies of this sort, such as resonant converters, have an advantage compared to hard switching topologies with regard to electromagnetic compatibility and switching losses. In the case of soft switching topologies, very often an oscillation of energy is imposed, for example, by resonant circuits, in order to recharge the capacities of the semiconductors and winding goods in a low-loss manner. This oscillation often leads to a higher current in the system and thus to additional flow losses. However, the reduction in switching losses is significantly greater than the increase in conduction losses, which provides soft switching topologies with a significant efficiency advantage compared with hard switching topologies. Furthermore, in current semiconductor development greater progress is being made in reducing flow losses than in reducing switching losses.

Due to their frequency-dependent components (for example, capacitors, coils, or transformers), resonant converters exhibit a frequency-dependent voltage transformation ratio between output voltage and input voltage. Thus, by altering a switching frequency, it is possible to set a transformation ratio that can be a value greater than, less than, or equal to 1. For example, with a corresponding choice of the number of turns of the transformer used in the resonant converter, this transformation ratio can be further adjusted. However, this transformation ratio is load-dependent apart from a special switching frequency. As resonant converters usually comprise two or more frequency-dependent components (for example, capacitors, coils, or transformers), there are often a plurality of resonant frequencies, where a load-independent transformation ratio only occurs at a particular resonant frequency in most cases. The resonant converter has almost no or very low switching losses and thus a very high efficiency only when operating with exactly this resonant frequency. If the converter is clocked with switching frequencies above or below this resonant frequency, then the efficiency is lower as higher conduction or switching losses occur at the same output voltage and output power.

During the operation of a resonant converter, in which the switching frequency is selected to be constantly equal to the resonant frequency (with a load-independent transformation ratio), although the best efficiency is achieved, fluctuations in the input voltage cannot be compensated. In order to make use of the frequency-dependent voltage transformation ratio in such cases, in order to keep the output voltage constant, the frequency-dependent components of the resonant converter must be selected such that the entire input voltage, output voltage and load range can be covered. If a large regulation range is required here, then this requires corresponding inductance or capacitance values which then, even when operating with the resonant frequency at which a load-independent transformation ratio is set, lead to worse efficiency than if only a very small regulation range is required. For this reason, an additional converter stage is usually connected upstream of the resonant converter for a wide input voltage range, as a result of which the input voltage of the resonant converter is kept constant independently of the input voltage of the switching power supply. This enables a corresponding dimensioning of the resonant converter for a very small regulation range, as a result of which a very high level of efficiency can be achieved.

When used in an AC voltage network, switching power supplies have a rectifier unit and a buffer or intermediate circuit capacitor on the input side to provide as constant an intermediate circuit voltage as possible for a downstream converter. As a result of the input-side rectifier unit together with the buffer capacitor, harmonics are also caused on the supply side by the switching power supply at the input. In order to keep these harmonics as low as possible, mandatory limits for harmonic currents have been set by international and/or European standards such as, for example, International Electrotechnical Commission (IEC) 61000-3-2 or EN 61000-3-2. To comply with these limits, switching power supplies now have an active or passive Power Factor Correction (PFC). A passive solution is, for example, a harmonic choke, which is connected between the rectifier unit and the buffer capacitor. This requires another relatively large winding material, however, which is associated with high losses. Usually, therefore, especially when very low harmonic currents are required, an active solution is employed. Here, an active stage connected directly downstream of the rectifier unit, which ensures low harmonics in the current profile (for example, sinusoidal, sinusoidal-like, on block-shaped) on the input side. For the following stages of the switching power supply, this active stage supplies an approximately constant voltage with a corresponding input current in order to meet the required limits for the harmonic currents.

A switching power supply for operation in an AC voltage network, in which a resonant converter is used for high efficiency, which is always operated independently of the input voltage with a resonant frequency at which there is a load-independent transformation ratio, and which maintains predetermined limit values for harmonic currents, usually has a three-stage, usually complicated construction. Typically, such a three-stage design (consisting of an active power factor correction, a converter stage to change the input voltage of the resonant converter and a resonant converter) is associated with a high degree of complexity and with cost-intensive, high component outlay. Such a three-stage design is disclosed, for example, in US 2006/0193153 A1.

Furthermore, a switching power supply for operation in an AC voltage network is disclosed in US 2009/0147553 A1, in which an output voltage is varied as a function of a load current or output current. For this purpose, the switching power supply comprises a rectifier unit for connection to the AC voltage network, a first and a second converter stage, where the second converter stage is configured as a resonant converter. Control signals for the control units for controlling the converter stages are generated via a variable control unit as a function of the load current. This means that output and intermediate circuit voltage are regulated as a function of the load current, when the latter exceeds a predetermined threshold value. The switching power supply described in US 2009/0147553 A1 thus has no optimum efficiency and multi-stage, relatively complex and costly control.

SUMMARY OF THE INVENTION

In view of the foregoing, it is therefore an object of the invention to provide a switching power supply having a simple, cost-effective and compact configuration that is highly efficient and that has an input current with a low harmonic content.

This and other objects and advantages are achieved in accordance with the invention by a switching power supply which can be used for operation in a three-phase AC voltage network, where the switching power supply is set up for operation in a three-phase AC voltage network. This switching power supply comprises a rectifier unit for rectifying a three-phase alternating mains voltage, a first and a second converter stage. The first converter stage is connected to the rectifier unit on the input side. An input voltage of the first converter stage is formed by the output voltage of the rectifier unit, and the output voltage of the first converter stage forms an intermediate circuit voltage that can be at least equal to or less than, where applicable also greater than the output voltage of the rectifier unit. The second converter stage is formed as a resonant converter, the input voltage of which forms the intermediate circuit voltage. This intermediate circuit voltage is regulated by the first converter stage at an output current of the switching power supply that is less than or no more than equal to a predeterminable value such that the intermediate circuit voltage or an average of the intermediate circuit voltage substantially corresponds to a predeterminable output voltage of the second converter stage or the resonant converter multiplied by a load-independent transformation ratio during operation of the second converter stage or the resonant converter at a resonant frequency.

On a forced reduction of the output voltage from the second converter stage or the resonant converter (for the purpose of limiting the output current to a predeterminable value) it is possible to set an, on average, sufficiently low intermediate voltage in such a manner that it remains possible to operate the second converter stage or the resonant converter substantially with the resonant frequency for the load-independent transformation ratio.

A signal for the regulation of the first converter stage can be derived from voltage and/or current information from the second converter stage or from the resonant converter.

The main aspect of the solution proposed in accordance with the invention is that the switching power supply in accordance with the invention comprises only two converter stages or only one intermediate circuit. As a result, the complexity of the circuit and component outlay and costs are reduced. By only using one intermediate circuit or two converter stages, it is possible to construct more compact devices, which nevertheless enable application-specific regulation of the output voltage across a large input voltage range while observing limit values for harmonic currents during operation in an AC voltage network. With the first converter stage, the intermediate circuit voltage can be regulated independently of the input voltage of the switching power supply and the load at the output of the switching power supply such that the second converter stage is always operated highly efficiently at an optimum operating point (ideally at a resonance frequency of the second converter stage or of the resonance converter at a load-independent transmission ratio).

Even if, for example, in the event of an overload or short circuit at the output of the switching power supply, the output current of the switching power supply must be kept as constant as possible at a predeterminable value, the first converter stage sets a sufficiently small intermediate circuit voltage on average so that in this case the second converter stage also runs at the previously described optimum operating point. The resonant converter can thus be optimized for a very small regulation range because the entire input voltage, output voltage and load range are adjusted by the first converter stage. As a result, the switching operations of the second converter stage always occur in as de-energized a manner as possible and almost without current. This achieves a very high degree of efficiency. Furthermore, the two-stage configuration of the switching power supply achieves a further improvement in efficiency compared to three-stage or multi-stage designs as in the case of two converter stages, fewer losses occur (for example, switching losses, or flow losses).

In principle, the signal for the regulation of the first converter stage can be directly derived from voltage and/or current information from the second converter stage or from the resonant converter. Here, the voltage and/or current information can provide information about the operating point of the second converter stage or of the resonant converter (for example, hyper-resonant, in resonance, sub-resonant). It can thus be easily recognized whether the second converter stage or the resonant converter is operating at the optimum operating point and, in the case of a deviation, the intermediate circuit voltage can be regulated accordingly by the first converter stage.

In the case of load-related, dynamic processes at the output of the switching power supply, compliance with the predeterminable values for output voltage and/or output current is advantageously ensured by the second converter stage or the resonant converter. The average value of the intermediate circuit voltage is adjusted in a temporally delayed manner by the first converter stage such that the second converter stage or the resonance converter can continue to be operated at the resonance frequency during the load-independent transmission ratio, i.e., at the optimum operating point. This means that in the case of load-dependent, dynamic processes or deviations from output voltage and/or output current at the output of the switching power supply from the predeterminable or desired values, a temporally rapid adaptation is undertaken by the second converter stage. The adjustment of the intermediate circuit voltage by the first converter stage for optimum operation of the second converter stage or of the resonant converter occurs in a delayed and slower manner. Thus, on the one hand, it is possible to quickly react to changes at the output of the switching power supply and furthermore to ensure optimum operation of the second converter stage or of the resonant converter.

It is advantageous if the first converter stage has buck converter functionality. This means that the first converter stage comprises a functionality via which the input voltage of the first converter stage converts into an output voltage that is smaller in magnitude than the input voltage. In this way, particularly in the case of high mains-side input voltages, an intermediate circuit voltage that is high in magnitude can be avoided as an input voltage for the second converter stage or the resonant converter. The first converter stage can therefore be configured, for example, as a buck converter, a buck-boost converter, a forward converter, a auk converter, or a SEPIC converter.

The first converter stage can, for example, be operated at a fixed frequency, where regulation ideally occurs via pulse width modulation (PWM). A regulator unit can be provided advantageously for regulation of the first converter stage. Alternatively, it is also possible to operate the first converter stage with a variable frequency at which the current in the first converter stage is built up and repeatedly reduced to zero so that the parasitic oscillations occurring in this case can be used to switch on switches used in the first converter stage at a voltage minimum. This technique is also known as the "valley switching" technique or "quasi-resonant" switching. With this technology, the switches used in the first converter stage, such as MOSFETs, IGBTs, or bipolar transistors, can operate in a low-loss switching mode.

Ideally, the second converter stage or the resonant converter is configured as a LLC converter. Resonant converters can be configured as LLC (or LCL) or LCC converters depending on the application and ensure low power dissipation and good efficiency. In the case of resonant operation, i.e., operation at the resonant frequency with load-independent transformation ratio, resonant converters, in particular in the LLC embodiment, generate very few interference signals.

In an expedient embodiment of the switching power supply in accordance with the invention, the intermediate circuit between the first converter stage and the second converter stage or the resonant converter has a buffer capacitor. The buffer capacitor is connected to an output side of the first converter stage or to an input side of the second converter stage or of the resonant converter. The input voltage for the second converter stage or the resonant converter is present here. The buffer capacitor usually has the task of bridging a very short-term interruption in the power supplied and thus of keeping the input voltage for the second converter stage constant.

In many applications of switching power supplies in a three-phase network, use of the switching power supply is also required in the event of the failure of one or all of the phases of the three-phase AC voltage network, for example, until this failure is resolved, in order, for example, to continue to supply power to plant parts in factories without interruption. In the event of a failure of a phase, however, there are time ranges at zero crossings of the input voltage in which no energy can be taken from the supply network, as a result of which the output voltage of the first converter stage or the voltage at the buffer capacitor, depending on the output power and capacitance of the capacitor, cannot be kept constant precisely in those time ranges from the first converter stage of the switched-mode power supply in accordance with the invention. The output voltage of the first converter stage or the voltage at the buffer capacitor therefore decreases again repeatedly for a short time. Therefore, in this case, when the intermediate circuit voltage drops, provided that this drop cannot be absorbed by the buffer capacitor, the output voltage is regulated by the second converter stage or the resonant converter.

Due to its frequency-dependent components (for example, capacitors, coils, or transformers), a resonant converter has a frequency-dependent voltage transformation ratio between the output voltage and the input voltage (=intermediate circuit voltage of the switching power supply in accordance with the invention). As a result, if appropriate, by changing the switching frequency a transformation ratio can be set that can have a value less than, equal to or greater than 1. If at least one phase of the three-phase AC voltage fails, then this property of the resonant converter can be used in the time ranges in which the voltage at the buffer capacitor, i.e., the intermediate circuit voltage, drops at the input of the resonance converter (i.e., at zero crossings of the network voltage) in order to perform a frequency change via a regulation and thus to change the transmission ratio. In this way, despite the failure of a phase until the fault is eliminated, a regulated output voltage can be ensured. During the period of the phase failure, however, the resonant converter no longer achieves its maximum efficiency as in the case of the presence of all three phases as the second converter stage or the resonant converter must repeatedly be operated in a hyper-resonant or sub-resonant manner for a short time. This means that the resonant converter is operated above or below the resonant frequency at a load-independent transformation ratio. If all the phases of the alternating voltage network are available again, the regulation of the second converter stage or of the resonant converter is terminated, where the regulation of the output voltage then occurs again essentially via the regulation of the intermediate circuit voltage by the first converter stage. For the regulation of the second converter stage or of the resonant converter during the failure of at least one phase, ideally another signal can be derived from the output voltage of the second converter stage or the resonant converter. The corresponding regulation can be taken over by the regulator unit, via which the first converter stage is regulated, or by a separate regulator unit.

In a further embodiment of the switching power supply, it is possible to set a higher intermediate circuit voltage in the event of the failure of a phase of the three-phase AC voltage network by the first converter stage in those time ranges in which energy is taken from the supply network. This higher intermediate circuit voltage is subsequently compensated by frequency variation of the resonant converter, where this is operated, depending on the intermediate circuit voltage, in a hyper-resonant or sub-resonant manner (i.e., above or below the resonant frequency at load independent transformation ratio). This makes it possible to optimize overall efficiency or to shift the additional losses in two-phase operation between the individual converter stages so that excessive overheating of individual components is avoided.

In an alternative, advantageous embodiment of the switching power supply, an additional stage is provided, which is connected on the input side to the buffer capacitor at the output of the first converter stage, and is connected on the output side to the second converter stage or the resonant converter. This additional stage can be activated for two-phase operation, i.e., for example, in the event of the failure of a phase of the three-phase AC voltage network. The activation of the additional stage in the event of a phase failure ensures that the resonant converter can continue to be operated essentially at the optimum operating point, i.e., with its resonant frequency with load-independent transformation ratio. With the additional stage, a voltage transformation ratio of output voltage (=input voltage of the resonant converter) to input voltage (=intermediate circuit voltage at the buffer capacitor) is set with a value greater than 1. The average of the input voltage of the resonance converter is thus essentially kept at a constant value necessary for the predetermined or desired output voltage.

The additional stage is switched off during normal operation or in a three-phase input voltage of the switching power supply. The additional stage is activated only in those time ranges when a drop in the intermediate circuit voltage, a drop in the voltage at the buffer capacitor at the output of the first converter stage, a drop in the output voltage of the switching power supply and/or a drop in a phase voltage at the input of the switching power supply is determined, such as in the event of failure of a phase at zero crossings of the mains voltage at the input of the switching power supply. For the activation of the auxiliary stage, an active switch can ideally be used, which is only clocked in the event of a drop in the intermediate circuit voltage. For this purpose, the active switch can be actuated with a switch-on time and/or frequency, via which the average value of the input voltage of the second converter stage or of the resonance converter is kept largely constant. For a further optimization, a switching frequency of the active switch is adjusted advantageously by a corresponding regulation of the active switch such that the active switch is switched on at a voltage minimum. As a result, possible additional switching losses are kept low. In normal operation with three-phase mains voltage, the active switch is permanently switched off and provides no switching losses.

Furthermore, it is advantageous if the additional stage can be bridged by a switching element, in particular a bypass diode, during normal operation with a three-phase mains voltage. A current in the intermediate circuit is thus guided past the additional stage. In this simple manner, flow losses through the additional stage during normal operation of the switched-mode power supply are reduced or prevented. A further optimization measure for the normal, three-phase operation could provide that the bypass diode is short-circuited, for example, by an active switch or a relay, in order to reduce the flow losses to a minimum.

The additional stage is ideally configured as a boost converter. The drop in the intermediate circuit voltage can be compensated in a simple manner via a boost converter, as in the case of a boost converter, usually the output voltage is always greater than the input voltage. Thus, the average of the input voltage for the resonant converter can be maintained substantially at a constant value for the desired output voltage.

By regulating the second converter stage or the resonant converter or by connecting the additional stage in the event of a drop in the intermediate circuit voltage, above all in the event of failure of a phase of the three-phase AC voltage network, for example, a buffer time can be increased in the event of a complete network failure. This means that the output voltage of the switching power supply or the second converter stage can be maintained for a longer period of time after a network failure. In this way, there are no effects on the output voltage of the switching power supply for a longer period of time in the event of network failures or network interruptions. This is achieved, for example, in that the buffer capacitor is connected in the intermediate circuit either by the resonance converter itself via a frequency change (during regulation of the resonance converter) or by the additional stage, and thus more energy can be removed from the buffer capacitor in order to continue to maintain the output voltage of the switching power supply.

Alternatively, if one phase of the three-phase AC voltage network fails, a buffer capacitor can be connected between the rectifier unit and the first converter stage via a control unit. By connecting a buffer capacitor between the rectifier unit and the first converter stage, those time ranges can be bridged at zero crossings of the input voltage in which no energy can be removed from the AC voltage network. As a result, a regulation of the second converter stage or the resonant converter or an activation of an additional stage between the first and second converter stage for keeping the output voltage constant is not required. The buffer capacitor should be connected such that peak values in the input current are not exceeded, in order to avoid excessive loading of the supply network and, if necessary, not to cause an upstream safety device to be triggered.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in an exemplary manner hereinafter with reference to the accompanying figures, in which.

DETAILED DESCRIPTION OF THE EXEMPLARY EMBODIMENTS

Figure 1:
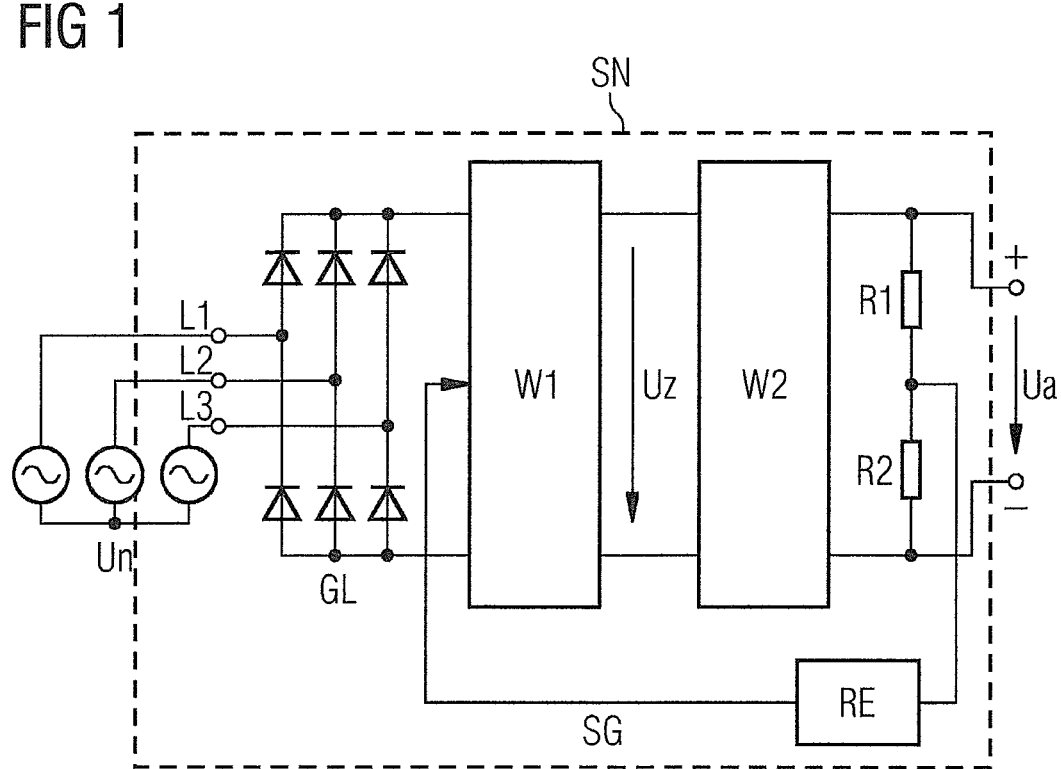
FIG. 1 is a schematic illustration of the switching power supply with two converter stages in accordance with the invention.

Figure is a schematic illustration of a switching power supply SN in accordance with the invention. The switching power supply SN is connected to a three-phase mains voltage Un or to an AC voltage source Un with three phases L1, L2, L3. The mains voltage Un forms the input voltage for the rectifier unit GL of the switching power supply SN. The mains voltage Un is rectified by the rectifier unit GL, which is formed, for example, as a 6-pulse rectifier.

Furthermore, the switching power supply SN comprises a first converter stage W1 via which a voltage transformation ratio can be set at least equal to or smaller than 1, optionally also greater than 1. The first converter stage W1 has buck converter functionality. This means that the first converter stage can, for example, be configured as a step-down converter or buck converter or a converter, such as a buck-boost converter, a forward converter, a Ćuk converter, or a SEPIC converter having a buck converter function is used. The first converter stage W1 is connected to the rectifier unit GL on the input side. The output voltage of the rectifier unit GL (in principle the rectified mains voltage Un) forms the input voltage of the first converter stage W1. An intermediate circuit voltage Uz is formed from the output voltage of the first converter stage W1.

The switching power supply SN further comprises a second converter stage W2 that is connected to the first converter stage W1 on the input side. The second converter stage W2 is configured as a resonant converter, in particular as a LLC converter. The intermediate circuit voltage Uz or the output voltage of the first converter stage W1 forms the input voltage of the second converter stage W2 or of the resonant converter W2.

A feedback-signal for a regulator unit RE can be derived from voltage and/or current information of the second converter W2. The regulator unit RE is divided into two sub-regulator units for this purpose. A first sub-regulator unit supplies at least one manipulated variable for the regulation of the second converter stage W2 or the resonant converter and a second sub-regulator unit at least one manipulated variable for the regulation of the first converter stage W1.

Alternatively, however, the feedback signal can also be derived from the output voltage Ua either directly or with the aid of a voltage divider R1. One or more manipulated variables SG, which are guided to the first converter stage W1, can be generated from the feedback signal by the regulator unit RE.

The feedback signal is used to regulate the output voltage Ua to a predeterminable value. The intermediate circuit voltage Uz and thus the input voltage of the second converter stage W2 or the resonant converter W2 can be regulated via the first converter stage W1 such that an average of the intermediate circuit voltage Uz essentially corresponds to a predeterminable output voltage Ua of the resonant converter W2 multiplied by a load-independent transformation ratio during operation of the resonant converter W2 at a resonant frequency. This means that in order to reach the predeterminable or desired value of the output voltage Ua of the resonant converter W2, the intermediate circuit voltage Uz is changed by the first converter stage W1 (regulated by the regulator unit RE) such that the second converter stage W2 or the resonant converter W2 is essentially operated at the optimum operating point, at the resonant frequency in the case of a load-independent transformation ratio.

For the regulation of the first converter stage W1, for example, a pulse width modulation can be used. At the input of the first converter stage W1, a current automatically occurs at a constant power at the output of the switching power supply SN, in which only a very small alternating current component is superimposed on a direct current component. This current flows back and forth through the rectifier unit GL, for example, in the case of a three-phase mains voltage Un, alternately for 120° through another supply line. The spectrum of the input current thus has only a low harmonic component, as a result of which, for example, predetermined limit values for harmonic currents are maintained in a simple manner by standards, such as EN6100-3-2.

FIG. 2a again illustrates an exemplary schematic diagram of the switching power supply SN in accordance with the invention comprising the rectifier unit GL, the first converter stage W1 and the second converter stage W2, which is configured as a resonant converter. A feedback signal for the regulator unit RE can be derived from the output voltage Ua of the second converter stage W2 or the resonant converter W2 either directly or with the aid of the voltage divider R1, R2, where two or more manipulated variables SG1, SG2 are guided to the two converter stages W1 and W2.

Figure 2A:
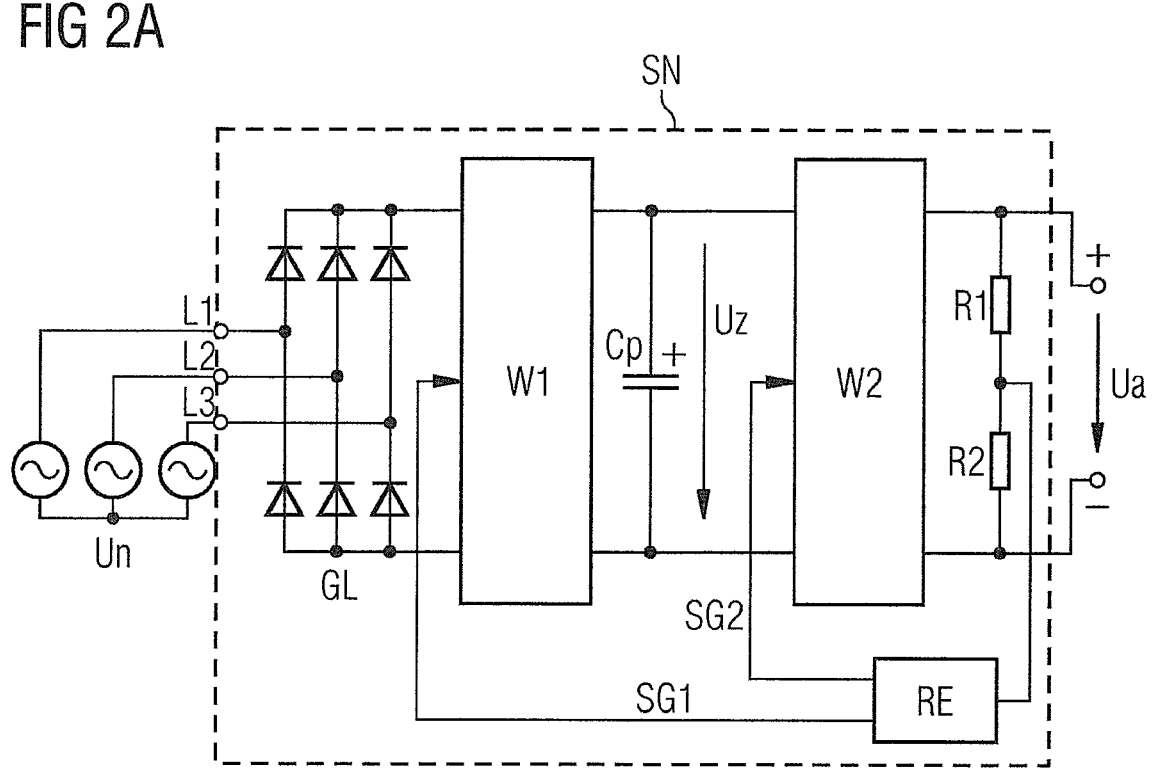
FIG. 2a is a schematic illustration of the switching power supply for two-phase operation in accordance with an embodiment of the invention.

Furthermore, the exemplary embodiment has a buffer capacitor Cp for the switching power supply SN according to FIG. 2a. The buffer capacitor Cp is inserted between the first converter stage W1 and the resonant converter W2. This means that the intermediate circuit between the two converter stages W1, W2 now has the buffer capacitor Cp to which the intermediate circuit voltage Uz is applied as input voltage for the resonant converter W2. With the buffer capacitor Cp, for example, very short-term interruptions in the current and/or voltage supply can be bridged and the intermediate circuit voltage Uz can be kept constant. This occurs, in particular in the event of the failure of a phase L1, L2, L3 of the three-phase AC voltage supply Un.

For use of the switching power supply SN in the event of failure of a phase L1, L2, L3 of the supply network Un, the second converter stage W2 or the resonance converter W2 continues to be regulated by the regulator unit RE. This regulation occurs in those time ranges in which no energy can be taken from the supply network Un, such as at voltage zero crossings of the input voltage, whereby the output voltage of the first converter stage W1 or the voltage at the buffer capacitor Cp, depending on the output power and capacitance of the capacitor Cp, cannot be kept constant by the first converter stage W1, and therefore drops repeatedly for a short time. The output voltage Ua of the resonant converter W2 can then no longer be kept at the predetermined value of the output voltage Ua by the first converter stage W1. Therefore, in the event of a drop in the intermediate circuit voltage Uz or in the event of a drop in the voltage at the buffer capacitor Cp, the regulation for the resonant converter W2 is activated. A change in the switching frequency of the resonant converter W2 is implemented for these time ranges via the regulator unit RE. As a result, the transmission ratio of the output voltage Ua to the input voltage of the resonant converter W2 (=intermediate circuit voltage Uz) can be changed and, if necessary, limited in time for phase failure, depending on requirements, be set to a value smaller than, equal to or greater than 1. A regulated output voltage Ua can thus be ensured.

Figure 2B:
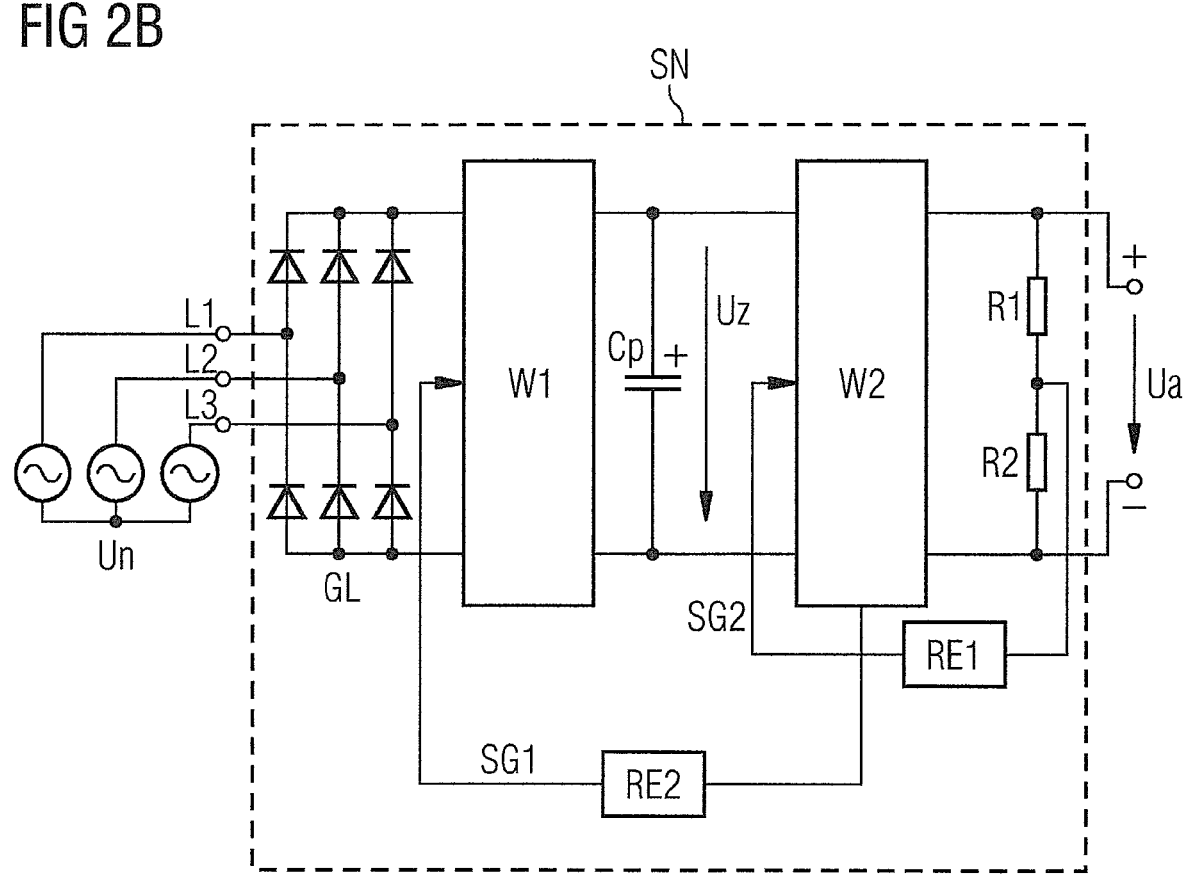
FIG. 2b is a schematic illustration of the switching power supply for two-phase operation with separate regulator units in accordance with an embodiment of the invention.

FIG. 2b is a schematic illustration of an exemplary embodiment of the switching power supply SN of FIG. 2a. The regulator unit is divided into two subregulator units RE1, RE2, where the first sub-regulator unit RE1 supplies the at least one manipulated variable SG2 for regulating the second converter stage W2 or the resonant converter and the second sub-regulator unit RE2 supplies the at least one manipulated variable SG1 for regulating the first converter stage W1. The signal for regulating the first converter stage W1 is, for example, from voltage or current information directly derived from the resonant converter W2, where the voltage or current information provides information about the operating point of the resonant converter W2 (hyper-resonant/in resonance/sub-resonant). The first sub-regulator unit RE1 thus regulates the output voltage Ua of the switching power supply SN by varying the frequency of the second converter stage W2 or the resonant converter. As a result, the second converter stage W2 can operate in a hyper-resonant, resonant or sub-resonant manner depending on the intermediate circuit voltage Uz. The intermediate circuit voltage Uz is thus adapted to the second sub-regulator unit RE2 in a further sequence until the transducer stage W2 or the resonant converter is essentially able to be operated in resonance, i.e., with the resonance frequency, in the case of a load-independent transmission ratio, and thus with optimum efficiency.

Figure 3:
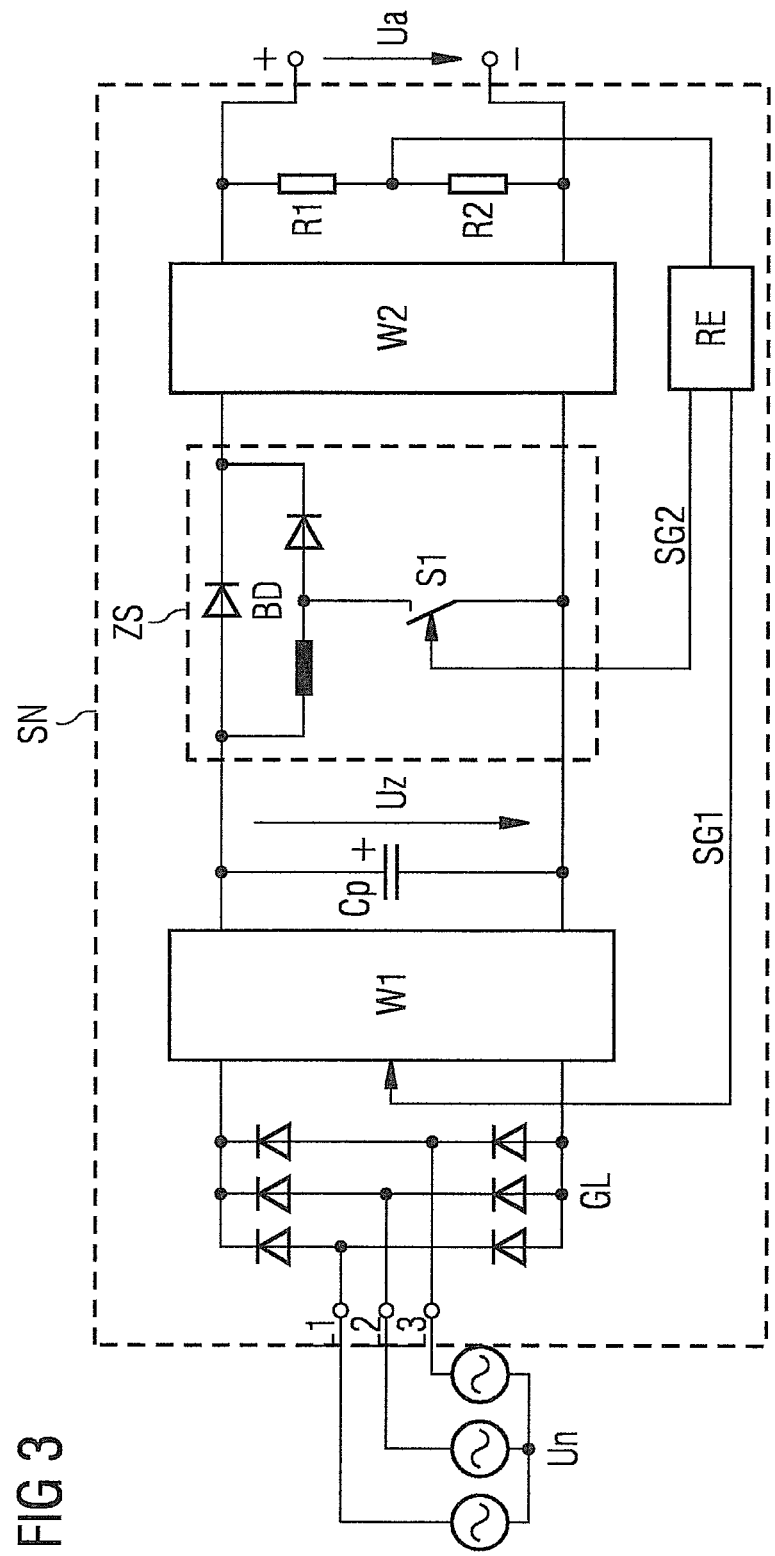
FIG. 3 is a schematic illustration of the switching power supply with an additional stage which can be activated for two-phase operation in accordance with another embodiment of the invention.

FIG. 3 is an exemplary schematic illustration of a further advantageous embodiment of the switching power supply SN in accordance with the invention which, for example, in the event of the failure of a phase L1, L2, L3 of the three-phase AC voltage supply Un, can ensure trouble-free operation of systems. This embodiment of the switching power supply SN provides that an additional stage ZS can be connected in the event of the failure of a phase L1, L2, L3. On the input side, the additional stage ZS is connected to the buffer capacitor Cp at the output of the first converter stage W1. The intermediate circuit voltage Uz thus forms the input voltage for the additional stage ZS when the additional stage ZS is activated. On the output side, the additional stage ZS is connected to the second converter stage W2 or the resonant converter W2. When the additional stage ZS is activated, the output voltage of the additional stage ZS thus forms the input voltage for the resonant converter W2.

The additional stage ZS is switched off during normal three-phase operation and is bridged by a switching element, such as a bypass diode BD, through which a current is passed to the additional stage ZS in the intermediate circuit. For optimizing or minimizing flow losses, the bypass diode BD could, for example, be short-circuited by an active switch or a relay during normal three-phase operation.

In the event of the failure of a phase L1, L2, L3 of the supply voltage Un, the additional stage ZS can be activated. Activation is triggered by a drop in the intermediate circuit voltage Uz or the voltage at the buffer capacitor Cp, as a result of an undesired drop in the output voltage Ua or as a result of a direct measurement of the phase voltages. The additional stage ZS or an active switch S1 for connecting the additional stage ZS is automatically controlled via the manipulated variable SG2 for those time ranges by the regulator unit RE with a predetermined frequency and a duty cycle in which the intermediate circuit voltage Uz falls or no power supply is available due to a phase failure by the input voltage of the switching power supply SN to keep the input voltage of the converter stage W2 or the resonant converter, and thus the output voltage Ua, constant. In the case of quasi-resonant or resonant control, the predetermined frequency can be tracked in a particular embodiment of the regulator unit RE such that the active switch S1 can always be switched on at a voltage minimum.

The additional stage ZS can, as shown by way of example in FIG. 3, be configured as a boost converter. With the additional stage ZS, the second converter stage W2 or the resonant converter W2 continues to be operated at the optimum operating point, i.e., at its resonant frequency in the case of a load-independent transformation ratio, even in the event of a phase failure.

Figure 4:
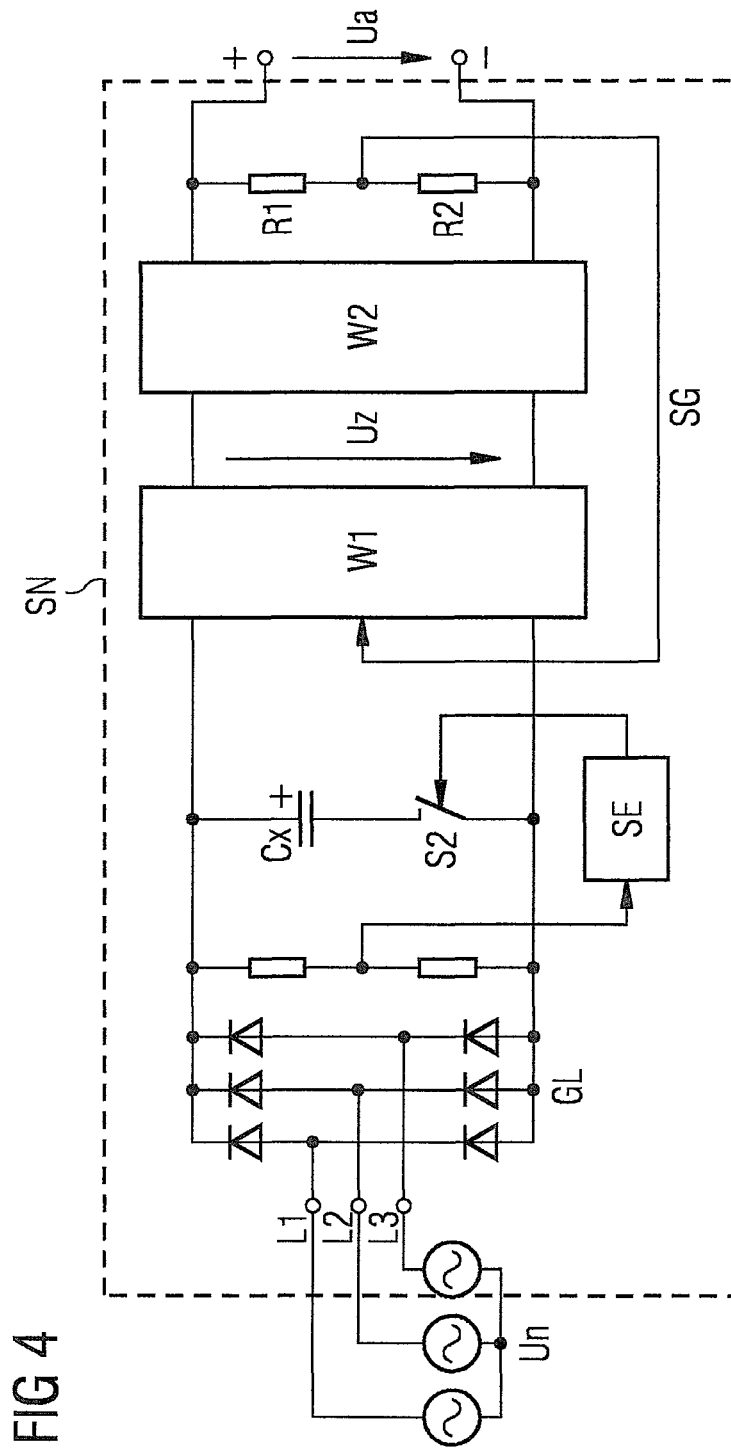
FIG. 4 is a schematic illustration of the switching power supply with a buffer capacitor which can be connected for two-phase operation in accordance with an embodiment of the invention.

FIG. 4 is a schematic illustration of a further, exemplary embodiment for operating the switching power supply SN in the event of the failure of a phase L1, L2, L3 of the three-phase supply voltage Un. In this case, in the event of the failure of a phase L1, L2, L3, a buffer capacitor Cx can be connected between the rectifier unit GL and the first converter stage W1. By connecting a buffer capacitor Cx between the rectifier unit GL and the first converter stage W1, it is possible to bridge those time ranges at zero crossings of the input voltage in which no energy can be taken from the AC voltage Un.

A control unit SE is provided for connecting the buffer capacitor Cx via which a switch S2 can be actuated. Using the switch S2, as a function of an output voltage, the rectifier unit GL, from which, for example, a signal for the control unit SE can be derived via a voltage divider, can be connected to the buffer capacitor Cx as required. In this embodiment according to FIG. 4, however, it must be taken into account that the connection of the buffer capacitor Cx should take place such that the supply network Un is not loaded excessively and an optional upstream safety device is not triggered.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A switched-mode power device comprising:
a rectifier unit for a mains connection and for rectifying a three-phase AC voltage;
a first converter stage, an input voltage of which forming an output voltage of the rectifier unit and an output voltage of which forms an intermediate circuit voltage; and
a second converter stage comprising a resonant converter, an input voltage of which forming the intermediate circuit voltage;
wherein the first converter stage is settable by the intermediate circuit voltage for an output current of the switched-mode power device which is less than or no more than equal to a predeterminable value such that an average of the intermediate circuit voltage essentially corresponds a predeterminable output voltage of the second converter stage multiplied by a load independent transformation ratio while operating the resonant converter with a resonant frequency and such that the second convertor stage is operated with the resonant frequency for the load-independent transformation ratio;
wherein, upon a forced reduction of the predeterminable output voltage of the second converter stage, the first converter stage limits the output current of the switched-mode power device to the predeterminable value to regulate the intermediate circuit voltage such that the second converter stage is continuously operable substantially with the resonant frequency for the load-independent transformation ratio; and
wherein a signal for regulating the first converter stage is derivable from at least one of (i) voltage and (ii) current information of the second converter stage.

2. The switched-mode power device as claimed in claim 1, wherein in an event of load-related dynamic processes on the output side of the switched-mode power device by the second converter stage, it is possible to ensure compliance with the predeterminable values for at least one of output voltage and output current; and
wherein an average value of the intermediate circuit voltage to a time delay is adaptable by the first converter stage such that the second converter stage is continuously operable at the resonance frequency in cases of a load-independent transmission ratio.

3. The switched-mode power device as claimed in claim 2, wherein the first converter stage has buck converter functionality.

4. The switched-mode power device as claimed in claim 1, wherein the first converter stage has buck converter functionality.

5. The switched-mode power device as claimed in claim 1, further comprising:
a regulator unit for regulation of the first converter stage.

6. The switched-mode power device as claimed in claim 1, wherein the first converter stage is regulated via pulse width modulation.

7. The switched-mode power device as claimed in claim 1, wherein the regulation of the first converter stage tracks a switching frequency of switches utilized in the first converter stage such that the switches utilized in the first converter stage are switched on at a voltage minimum.

8. The switched-mode power device as claimed in claim 1, wherein the second converter stage comprises an LLC converter.

9. The switched-mode power device as claimed in claim 1, wherein the intermediate circuit between the first converter stage and the second converter stage includes a buffer capacitor.

10. The switched-mode power device as claimed in claim 9, wherein in an event of a drop in the intermediate circuit voltage, the transformation ratio of the second converter stage changes such that the output voltage of the switched-mode power device is maintained at the predeterminable value.

11. The switched-mode power device as claimed in claim 10, wherein the drop in the intermediate circuit voltage comprises failure of at least one phase of the three-phase AC voltage.

12. The switched-mode power device as claimed in claim 10, wherein a further signal is derivable from the output voltage of the second converter stage for regulation of the second converter stage.

13. The switched-mode power device as claimed in claim 9, further comprising:
an additional stage which is connected on the input side to the buffer capacitor at the output of the first converter stage and on the output side to the second converter stage, said additional stage being activatable in an event of failure of at least one phase of the three-phase AC voltage.

14. The switched-mode power device as claimed in claim 13, wherein the additional stage is activatable by at least one of (i) a drop in the intermediate circuit voltage, (ii) a drop in a voltage on the buffer capacitor at the output of the first converter stage, (iii) a drop in the output voltage of the switched-mode power device and (iv) a drop in a phase voltage on the input side on the switched-mode power device.

15. The switched-mode power device as claimed in claim 14, further comprising:
an active switch which is controllable for the activation of the additional stage with at least one of (i) a switch-on time and (ii) at a frequency such that an average value of an input voltage of the second converter stage is kept largely constant.

16. The switched-mode power device as claimed in claim 13, further comprising:
an active switch which is controllable for the activation of the additional stage with at least one of (i) a switch-on time and (ii) at a frequency such that an average value of an input voltage of the second converter stage and is kept largely constant.

17. The switched-mode power device as claimed in claim 16, wherein a switching frequency of the active switch is settable via a regulation such that the active switch is switched on at a voltage minimum.

18. The switched-mode power device as claimed in claim 13, further comprising:
a switching element;
wherein the additional stage is bridgeable by the switching element during normal operation of the three-phase AC voltage.

19. The switched-mode power device as claimed in claim 18, wherein the switching element comprises a bypass diode.

20. The switched-mode power device as claimed in claim 13, wherein the additional stage comprises a boost converter.

21. The switched-mode power device as claimed in claim 1, further comprising:
   a buffer capacitor; and
   a control unit between the rectifier unit and the first converter stage;
   wherein in an event of failure of at least one phase of the three-phase AC voltage, the buffer capacitor is connectable via the control unit.

* * * * *